United States Patent
Goldberg et al.

(10) Patent No.: US 6,769,048 B2
(45) Date of Patent: Jul. 27, 2004

(54) CACHE SYNCHRONIZATION METHOD, SYSTEM AND APPARATUS FOR A DISTRIBUTED APPLICATION AND AN OBJECT LOCATED IN A CLIENT CACHE

(75) Inventors: Robert N. Goldberg, Emerald Hills, CA (US); Yury Kamen, Foster City, CA (US); Bruce K. Daniels, Capitola, CA (US); Peter A. Yared, San Francisco, CA (US); Syed M. Ali, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 252 days.

(21) Appl. No.: 10/010,224

(22) Filed: Dec. 6, 2001

(65) Prior Publication Data

US 2003/0110358 A1 Jun. 12, 2003

(51) Int. Cl.[7] ............................................... G06F 13/00
(52) U.S. Cl. ......................................... 711/141; 709/213
(58) Field of Search ........................ 711/141; 707/201; 709/213

(56) References Cited

U.S. PATENT DOCUMENTS

| | | | | |
|---|---|---|---|---|
| 5,499,371 A | | 3/1996 | Henninger et al. ......... 717/108 |
| 5,615,362 A | | 3/1997 | Jensen et al. ........... 707/103 R |
| 5,706,506 A | | 1/1998 | Jensen et al. ........... 707/103 R |
| 5,872,969 A | * | 2/1999 | Copeland et al. ........... 709/101 |
| 6,078,926 A | | 6/2000 | Jensen et al. ........... 707/103 R |
| 6,216,212 B1 | * | 4/2001 | Challenger et al. ......... 711/163 |
| 6,233,606 B1 | * | 5/2001 | Dujari ......................... 709/213 |
| 6,591,266 B1 | * | 7/2003 | Li et al. ....................... 707/10 |
| 6,633,862 B2 | * | 10/2003 | Thompson ..................... 707/1 |
| 2003/0028683 A1 | * | 2/2003 | Yorke et al. ................. 709/315 |

* cited by examiner

Primary Examiner—Glenn Gossage
(74) Attorney, Agent, or Firm—Osha & May L.L.P.

(57) ABSTRACT

A cache synchronization method and apparatus for a distributed application having a client side, a server side, and an object located on either the client side or the server side are disclosed. The cache synchronization method may include detecting initiation of a transition to a new state on the client side, locating data on the client side that is to be synchronized, synchronizing located data using a cache synchronizer interposed between the client side and the server side, and completing the transition to the new state on the client side. The cache synchronizer may include a client side application usage specification (AUS) manager and a server side AUS manager. The cache synchronization method may also include synchronizing data in the object by passing to a database changes made locally to the object and allowing the distributed application to transition to a new state when synchronization is complete.

20 Claims, 4 Drawing Sheets

CACHE SYNCHRONIZATION METHOD, SYSTEM AND APPARATUS FOR A DISTRIBUTED APPLICATION AND AN OBJECT LOCATED IN A CLIENT CACHE

BACKGROUND OF THE INVENTION

Modern enterprise applications are typically implemented as multi-tier systems. Multi-tier systems serve the end-user through a chain of client/server pairs. Enterprise systems are typically implemented in a number of components, where each component may contain multiple object instances at runtime. The components are distributed across the client/server pairs. At runtime, each component interacts with other components in the system to provide a set of functions to the system.

FIG. 1 shows distributed components 2, 4 in a client/server environment. The component 2 is the client, and the component 4 is the server. The client component 2 uses services from the server component 4 in order to provide functions to the system. In a four-tiered system, the client component 2 may be a web component hosted on a client 6, and the server component 4 may be an application component hosted on a server 8. The client component 2 may contain the logic required to display content on a web browser 10. In order to generate content for the web browser 10, the client component 2 typically needs to access enterprise data via the server 8. Enterprise data may be held within a database 12 or within some other persistent data store. The database 12 is hosted on a database server 13, which provides multiple management functions for the database 12, such as regulating access to the data contained within the database 12. These functions are carried out by database objects 17 located inside database components 15 that are located on the database server 13. The client component 2 interacts with the enterprise data in the database 12 through the server component 4. In a three-tiered system, the application server 8 would typically be absent, and the client component 2 interacts with the database 12 directly through the database server 13.

At runtime, the server component 4 includes one or more objects 14, which may be persistent objects that model data within the database 12 or transient objects that can perform operations such as reading or writing from the database 12 or executing business logic. At runtime, the client component 2 and the server component 4 belong to different address spaces, which may be in the same machine or in different machines connected by a network link, such as network link 16. Before the client component 2 can invoke a method of a server object 14, the server object 14 must exist in the server component 4. If the server object 14 is not already in the server component 4, the client component 2 needs to call on other objects already in the server component 4 to instantiate the server object 14. Typically, the client component 2 calls on an object factory 18 that knows how to instantiate the server object 14. Once the server object 14 is instantiated or is found, the client component 2 can invoke a method of the server object 14 by sending a message to the server object 14. Typically, the client component 2 locates the server object 14 through an object location service 20 that keeps track of the location of all distributed objects in the system. The server object 14 executes the operation requested by the client component 2 and returns the result to the client component 2.

When objects are used in a distributed environment, such as that described above, it is often desirable to maintain a cache of objects close to where the objects are accessed most frequently. For example, in the environment illustrated in FIG. 1, it may be desirable to cache objects on the client 6, remote from the application server 8 and the database 12 where the state of the objects is ultimately stored. The reasons for caching the objects on the client 6 are to decrease network latency, reduce bandwidth demand, and improve client availability. The client cache 38 in FIG. 1 acts as an intermediary system that intercepts requests for access to the database 12 (via the application server 8 in the case of a four-tiered application). The client checks if the requested object is available in its local storage, i.e., client cache 38. If available, a reference to the requested object is sent back to the requesting program, e.g., the client component 2. Otherwise, the client cache 38 forwards the request to another cache or the database management system (DBMS) to retrieve the requested object from the database 12. When the client cache 38 receives the requested object, the client cache 38 keeps a copy of the object in its local storage and forwards a reference to the object to the requesting program.

In a distributed environment, there may be multiple client processes requesting access to objects stored in a database. Each process may include a client cache for storing a local copy of objects retrieved from the database. When an object is represented in more than one client cache, or when the database representation of the object can be updated by means other than the object, a cache coherency problem may arise, whereby the objects stored in the caches become inconsistent with each other and/or with the underlying database copy. In this case, programs that use the cached objects may produce incorrect results based on "stale" data. Therefore, maintaining coherency between distributed caches and the database is important.

Most object-oriented database products and object-relational mapping systems maintain caches of some kind. Some of these systems also provide mechanisms for maintaining distributed objects. Various work has been done on synchronizing caches in database systems by sending events or messages from the DBMS to the distributed clients. This strategy can be effective if it is handcrafted, but tends to flood the network with updates if used indiscriminately. Further, database transactions provide a mechanism for ensuring that serializability between concurrently running applications is reliably detected. However, for applications that have high transaction rates (such as web applications), it is not practical to enforce strict serializable transactions. Instead, applications are typically hand-tailored to prevent critical collisions and to allow other collisions that may not matter.

The objects derived from a database are typically used by multiple applications, and prior-art cache consistency is typically keyed to the object schemas. For a given application, the result is either a schema that is too strict, limiting the ability to scale the application, or a schema that is too lenient, allowing collisions that would produce incorrect results. For example, consider a set of objects representing a purchase order, including a reference to an item being sold and the customer making the order. If the item becomes out of stock while the purchase is being made, the customer should be made aware of the change prior to committing the order. However, if the item becomes out of stock while a report of the customer's yearly purchases is being generated, the change in status of the item may not matter. In general, the difference depends on the application's use of the objects, not on inherent characteristics of the objects.

SUMMARY OF THE INVENTION

A cache synchronization method for a distributed application having a client side and a server side, comprises detecting initiation of a transition to a new state on the client side, locating data on the client side that is to be synchronized, synchronizing located data using a cache synchronizer interposed between the client side and the server side, and completing the transition to the new state on the client side.

A cache synchronization method for a distributed application having a client side and a server side, comprises detecting initiation of a transition to a new state on the client side, locating data on the client side that is to be synchronized, synchronizing located data using a cache synchronizer interposed between the client side and the server side, completing the transition to the new state on the client side, executing business logic on the server side during the transition, and retrieving data for the new state from a database.

A cache synchronization method for an object located in a client cache, comprises receiving a transition request to transition to a new state by a client-side distributed application, determining the object to be synchronized by a cache synchronizer, synchronizing data in the object by passing to a database changes made locally to the object, and allowing the distributed application to transition to the new state when synchronization is complete.

A cache synchronizing system for a distributed application having a client component and a server component, comprises a cache synchronizer interposed between the client component and the server component to perform caching services and processing requests, wherein the cache synchronizer comprises a client-side application usage specification manager and a server-side application usage specification manager, wherein the client-side application usage specification manager is configured to intercept a request made to the server component from the client component and configured to synchronize data on the client component prior to processing the request.

An apparatus for cache synchronization of a distributed application having a client side and a server side, comprises means for detecting initiation of a transition to a new state on the client side, means for locating data on the client side that is to be synchronized, means for synchronizing located data means for completing the transition to the new state on the client side, means for executing business logic on the server side during the transition, and means for retrieving data for the new state from a database.

An apparatus for cache synchronization for an object located in a client cache, comprises means for receiving a transition request to transition to a new state by a client-side distributed application, means for determining the object to be synchronized, means for synchronizing data in the object by passing to a database changes made locally to the object, and means for allowing the distributed application to transition to the new state when synchronization is complete.

Other features and advantages of the invention will be apparent from the following description and the appended claims.

DETAILED DESCRIPTION

Figure 1:
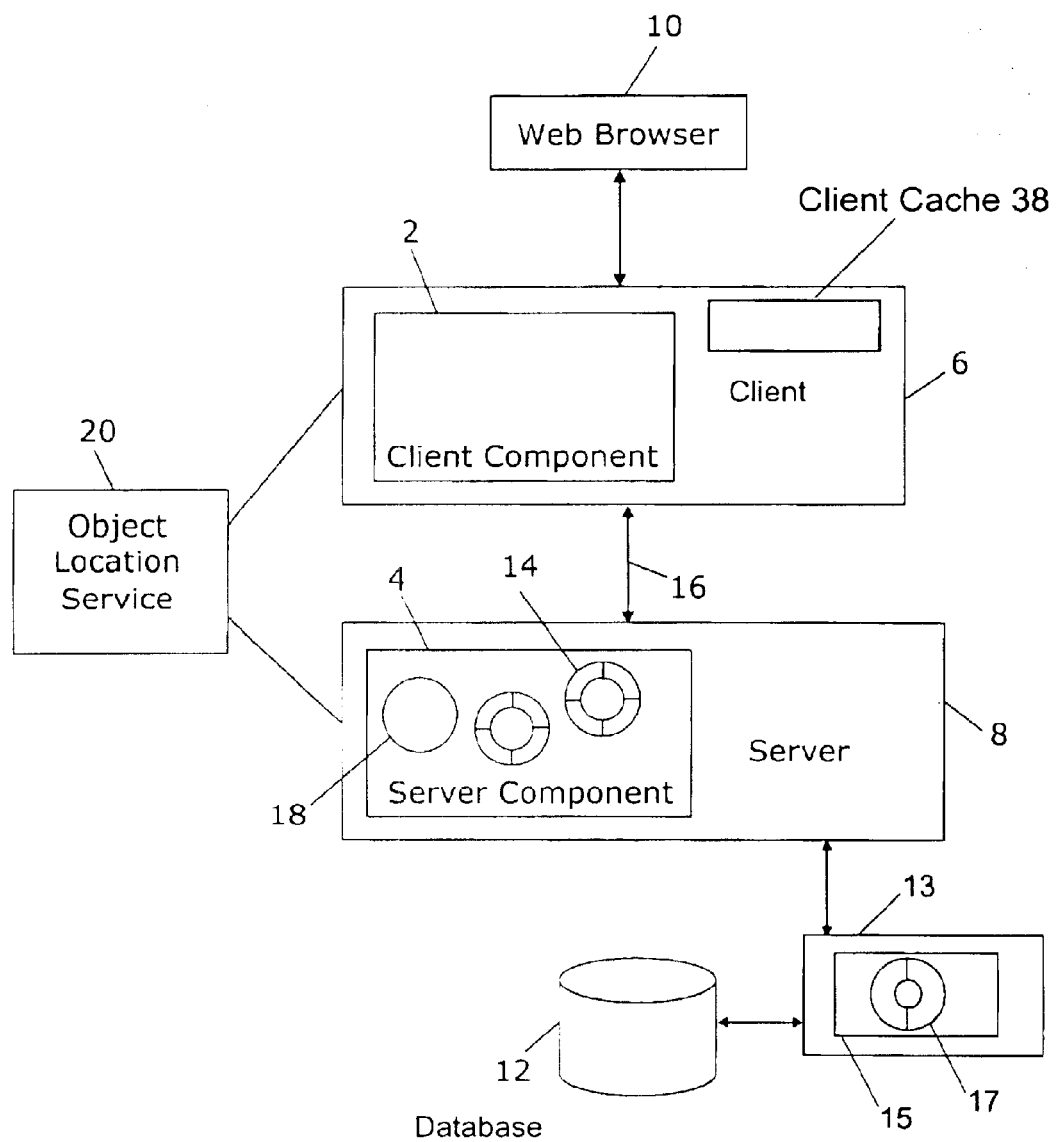
FIG. 1 is a block diagram of a distributed application.

Exemplary embodiments of the invention will be described with reference to the accompanying drawings. Like items in the drawings are shown with the same reference numbers.

The following is a detailed description of specific embodiments of the invention. In the following detailed description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A cache synchronizer consistent with the embodiments of the present invention ensures object cache coherency in a distributed application. The cache synchronizer bases object cache coherency on application usage specifications rather than object schemas. An application usage specification (AUS) describes the application as a series of states and transitions. The states represent information derived from objects, for example, a state might correspond to a single screen displayed to an end-user of a client process. The transitions represent business logic and operations that occur between any two given states. The AUS also includes consistency requirements for each datum. The AUS may be provided by the programmer or generated dynamically by a client. The cache synchronizer interprets the AUS. Transition between states is typically caused by a user-gesture, such as pressing a key, moving a mouse, etc. In the context of a web application, for example, web pages are states, and transitions are the buttons/actions on the web pages that take the user to a different page (or state). The cache synchronizer restricts communication with the server to transitions between states.

For each state of the application, the cache synchronizer fetches and caches the objects or portions of objects required to represent the state. The cache synchronizer determines the objects required to represent states in the application based on the AUS.

The objects are cached in a cache located on the client and can be accessed locally by the client process. Before business logic is invoked on the server, the cache synchronizer passes all changes made locally to the cached objects to the database and verifies if there have been any inconsistent changes made to the database by other instances of the application, e.g., an instance of the application running on another client. Further, the cache synchronizer may verify if any read inconsistencies have occurred. Read inconsistencies arise as data is modified by another application, or other external processes, e.g., processes running on the server.

By fetching objects based on the requirements of the current state, the cache synchronizer ensures that the most recent value of any critical data is presented in a state when it first appears. In addition, by passing all changes made locally to the objects before transitioning to the next state, the cache synchronizer ensures that changes made to critical data by other application instances are detected during any transition out of the state that uses the data, and that business logic performed on the server acts on the correct data.

Figure 2:
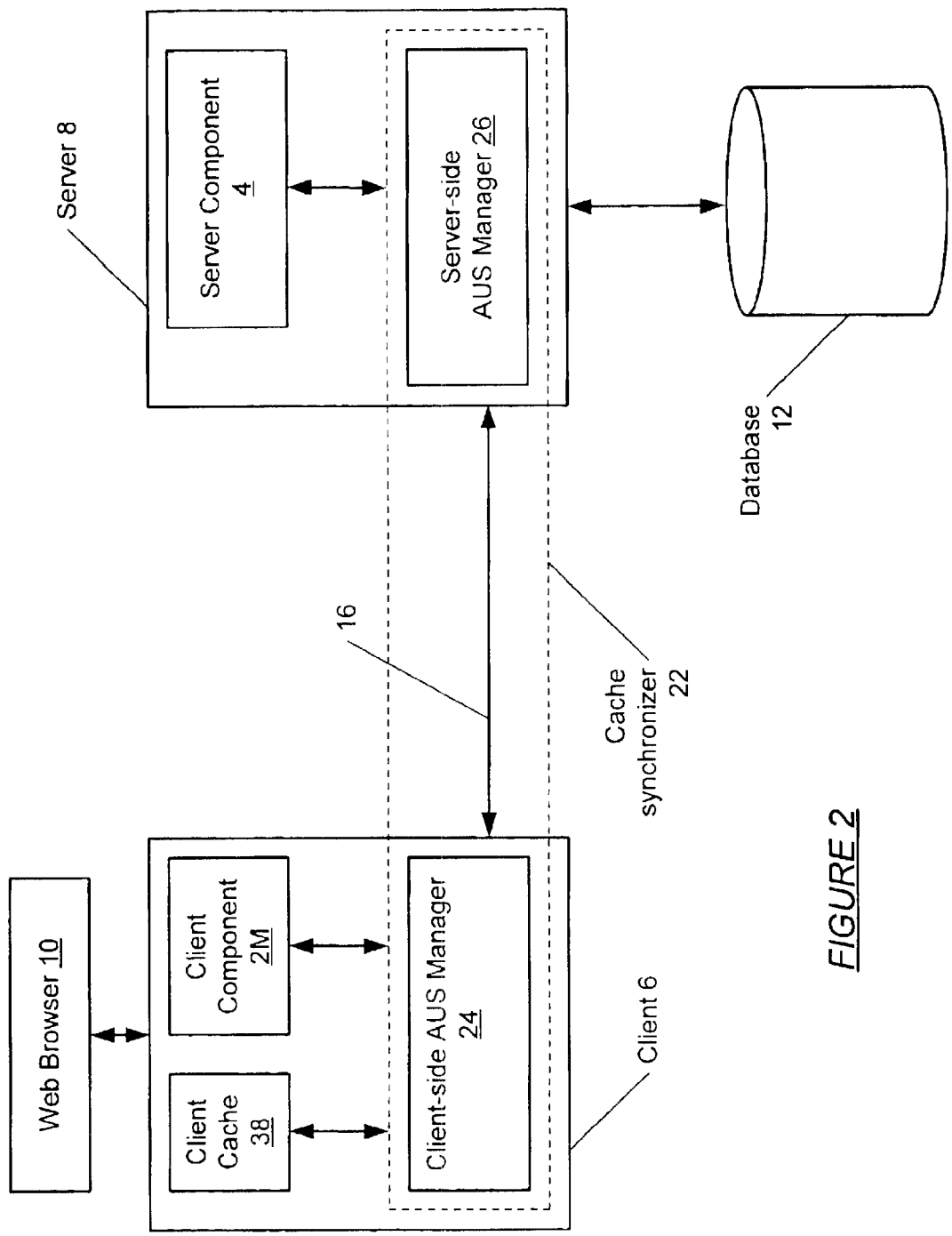
FIG. 2 illustrates a cache synchronizer, in accordance with one or more embodiments of the present invention.

FIG. 2 shows a cache synchronizer 22 according to one or more embodiments of the present invention, positioned between a client component 2 and the server component 4. The client component 2 uses the cache synchronizer 22. The cache synchronizer 22 performs various caching services in addition to processing requests. The cache synchronizer 22 includes a client-side AUS manager 24 that interacts with the client component 2 and a server-side AUS manager 26 that interacts with the server component 4. The client-side AUS manager 24 and the server-side AUS manager 26 of the cache synchronizer 22 communicate over the network link 16.

The client-side AUS manager 24 intercepts calls from the client component 2 in order to automatically ensure cache coherency. At runtime, the client-side AUS manager 24 monitors the states of the cached objects. A state may correspond to information displayed to an end user, e.g., using a web browser 10. In order to generate the information to display to the end-user, the client component 2 needs data from one or more objects in the server component 4. A transition may correspond to one or more method calls required to move the application from one state to another. Typically, the transition is initiated through user gestures, such as clicking a mouse or hitting a key. The client-side AUS manager 24 determines what objects are required to represent the current state of the application and fetches the data from the server component 4 based on this information. In addition, the client-side AUS manager 24 passes all changes made locally to the objects to the database objects, verifying if there have been any inconsistent changes made to the database objects by other applications. The client-side AUS manager 24 may be implemented as a runtime library that includes a set of routines that are bound to the client, e.g., client component 2, at runtime.

Further, the client-side AUS manager 24 receives objects from the client component 2 and packs the objects for transport to the server-side AUS manager 26. The client-side AUS manager 24 also receives object packages from the server-side AUS manager 26 and unpacks the object packages so that the client-side AUS manager 24 can access the objects. Further, the client-side AUS manager 24 uses the AUS to determine the consistency requirements for each datum involved in the current state and transition, as well as the next state. This procedure allows the application to ensure that the most recent value of any critical datum is presented in a state when the datum first appears, and that any changes made to critical data by other application instances are detected during any transition out of the state that uses the data.

As shown in FIG. 2, the server-side AUS manager 26 provides application-independent services to the client-side AUS manager 24, such as fetching data from the server component 4 based on a usage description from the client-side AUS manager 24, and invoking method calls on objects in the server component 4. Further, the server-side AUS manager 26 provides synchronization services to verify that data being sent to the client-side AUS manager 24 is consistent. Further, the server-side AUS manager 26 provides verification services to ensure that data sent from the client-side AUS manager 24 is correctly synchronized with data residing on the server component 4, and data residing in the database 12.

In order to take advantage of the cache synchronizer 22, an application should be described as a series of states and transitions. The states represent the information (derived from objects) needed by an application, for example displayed on a web browser. The transitions represent the business logic and operations that occur between any two given states. The description of the application also includes the consistency requirements for each datum.

In an example scenario, a set of objects represents a purchase order, including a reference to an item being sold and a reference to a customer making the order. If the item becomes out of stock while the purchase is being made, the customer should be made aware of the change prior to committing the order. When the customer sends the order request, the cache synchronizer 22 verifies if the product exists by updating any changes made locally to the objects with the database objects based on the AUS. If the data in the object was stale, the data would indicate that the item was in stock, when the item was actually out of stock. However, when the application transitions to the next state, e.g., the order confirmation screen, this information, being a critical datum, is verified and updated by the cache synchronizer 22 to indicate that the item is now out of stock.

Figure 3:
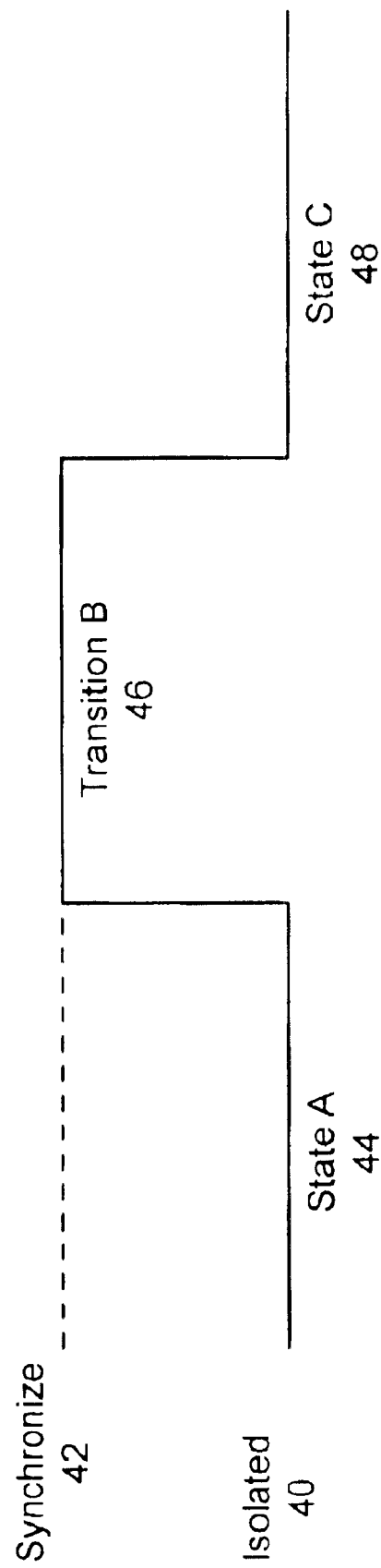
FIG. 3 illustrates a state diagram, in accordance with one or more embodiments of the present invention.

FIG. 3 illustrates a state diagram in accordance with one or more embodiments of the present invention. A distributed application adapted to run in conjunction with the cache synchronizer 22 is always in one of two possible states. A first state is denoted as an "isolated state" 40. In the isolated state 40, the distributed application is running on a client component 2 and has no interaction with the server component 4. When the user triggers or initiates a transition to a new state through user gestures, such as clicking a mouse, hitting a key, etc., the distributed application enters a second state denoted as a "synchronize state" 42. In the synchronize state 42, the distributed application interacts with the server component 4. Interactions include synchronizing data on the server component 4 with data on the client component 2. Further, during the synchronize state 42, methods may be executed on the server component 4 and results forwarded to the client component 2. Once the data have been synchronized, methods executed, and data retrieved based on the AUS to represent new state, the distributed application then returns to the isolated state 40.

Still referring to FIG. 3, consider the example of the purchase order described above. When the customer is ordering the item, the distributed application is running in the isolated state 40, such as State A 44. Once the customer sends the order request, the distributed application enters the synchronize state 42, such as Transition B 46. During Transition B 46, the distributed application verifies that the item is available. In this scenario the item is sold out, thus the distributed application retrieves data corresponding to a web page that indicates the item is sold out. Once this data has been retrieved, the distributed application enters an isolated state 40, such as State C 48. This cycle continues until the application is exited.

Figure 4:
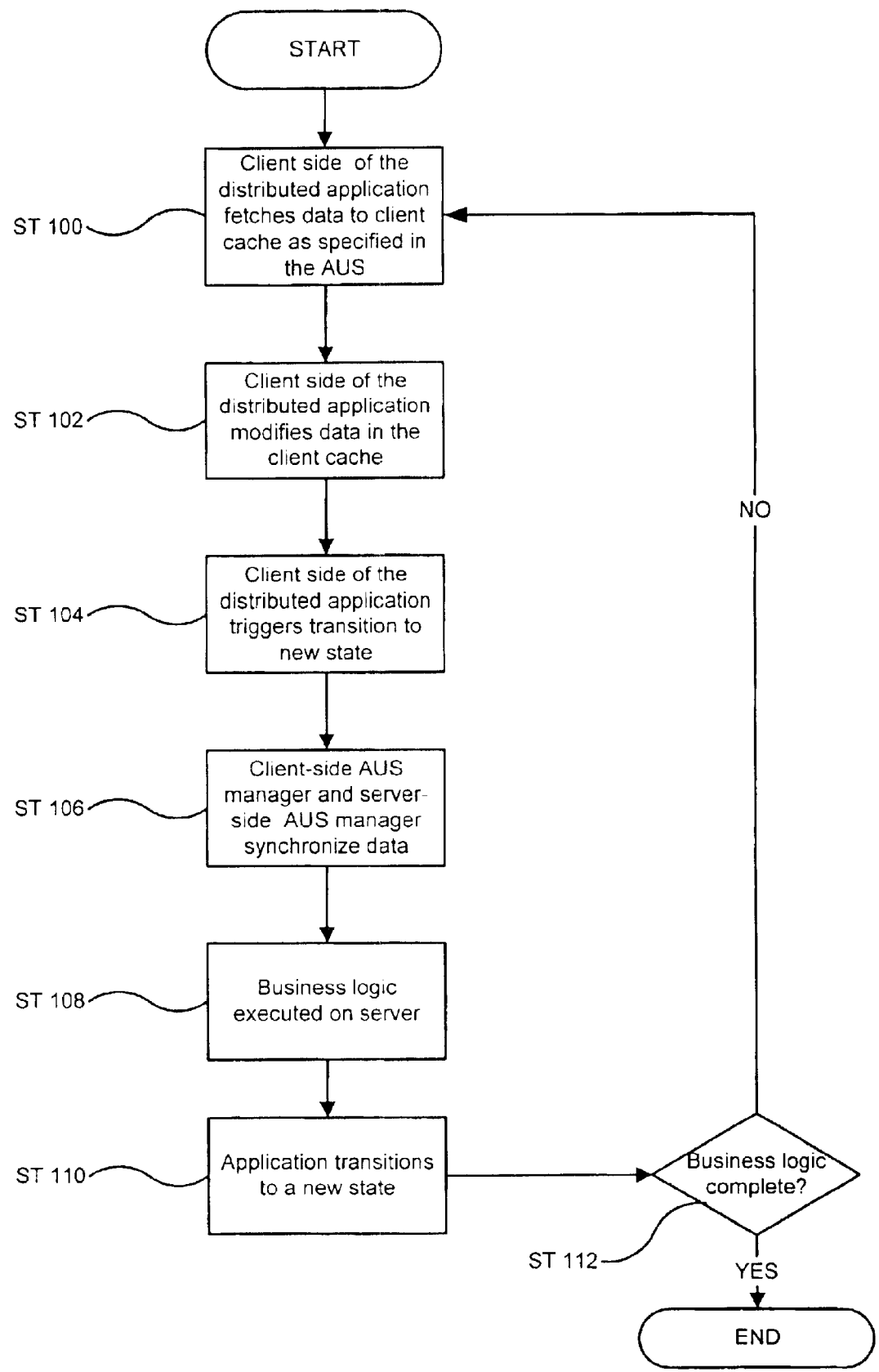
FIG. 4 illustrates a flowchart of a typical operation sequence of the cache synchronizer, in accordance with one or more embodiments of the present invention.

FIG. 4 illustrates a flowchart of a typical operation sequence of the cache synchronizer, in accordance with one or more embodiments of the present invention. A client side of the distributed application fetches data to a client cache, as specified in the AUS (Step or ST 100). The client-side of the distributed application modifies the data in the client cache (step 102). For example, the client-side of the distributed application may present the user with a form to complete. The user subsequently completes the form by modifying the data. The client side of the distributed application then triggers or initiates a transition to a new state (Step 104). For example, the user may click a "Submit" button at the bottom of the form prompting the client-side of the distributed application to trigger or initiate a transition to a new state. The client-side AUS manager and the server-side AUS manager work together to synchronize data in the client cache with data on the server or data in a database connected to the server (Step 106). The server side of the distributed application executes business logic on the server (Step 108). Once the business logic execution is complete, the application transitions to a new state (Step 110). If there is more business logic execution to complete, then the above-mentioned steps are repeated until the business logic is complete (determined in step 112).

In one embodiment of the present invention, data synchronization is completed on the server-side AUS manager. The server-side AUS manager receives data from the client-side AUS manager and then proceeds to synchronize the data. The server-side AUS manager may employ any synchronization method that meets the requirements of the distributed application. In one embodiment of the present invention, the server-side AUS manager uses a synchronization scheme that utilizes a timestamp method or a checksum method to determine what data has been modified. Additionally, the synchronization scheme allows the server-side AUS manager to handle read inconsistencies. Those skilled in the art will appreciate that synchronization may also be handled by the client-side AUS manager.

Advantages of the present invention may include one or more of the following. The cache synchronizer efficiently automates cache synchronization by verifying at each transition if there have been any inconsistent changes made to the database by other applications. In this manner, the most recent value of any critical datum is presented to a state when it first appears, and any changes made to critical data by other application instances are detected during any transition out of the state that uses the data. The cache synchronizer is a scalable solution that allows for high transaction rates while strictly enforcing cache consistency at the level required by the application. The cache synchronizer imposes a natural structure on the specification of the application, enabling more aggressive optimization. Those skilled in the art can appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cache synchronization method for a distributed application having a client side and a server side, comprising:
   detecting initiation of a transition to a new state on the client side;
   locating data on the client side that is to be synchronized;
   synchronizing located data using a cache synchronizer interposed between the client side and the server side; and
   completing the transition to the new state on the client side,
   wherein the cache synchronizer comprises a client-side application usage specification (AUS) manager and a server-side application usage specification (AUS) manager.

2. The method of claim 1, wherein the client side is isolated from the server side while the client side is in the new state.

3. The method of claim 1, wherein the client side interacts with the server side during the transition.

4. The method of claim 1, further comprising:
   executing business logic on the server side during the transition.

5. The method of claim 1, further comprising:
   retrieving data for the new state from a database.

6. The method of claim 1, wherein the new state represents information derived from an object.

7. The method of claim 1, wherein the transition represents business logic and operations that occur on the server side prior to entering the new state.

8. The method of claim 1, wherein the transition and the new state comprise an application usage specification.

9. The method of claim 1, wherein the server-side application usage specification (AUS) manager and the client-side application usage specification (AUS) manager communicate over a network link.

10. The method of claim 1, wherein the client-side application usage specification (AUS) manager interacts with the client side.

11. The method of claim 1, wherein the server-side application usage specification (AUS) manager interacts with the server side.

12. The method of claim 1, wherein the synchronization occurs on the server side.

13. The method of claim 12, wherein the synchronization uses a timestamp method.

14. The method of claim 12, wherein the synchronization uses a checksum.

15. A cache synchronization method for a distributed application having a client side and a server side, comprising:
- detecting initiation of a transition to a new state on the client side;
- locating data on the client side that is to be synchronized;
- synchronizing located data using a cache synchronizer interposed between the client side and the server side;
- completing the transition to the new state on the client side;
- executing business logic on the server side during the transition; and
- retrieving data for the new state from a database,
- wherein the cache synchronizer comprises a client-side application usage specification (AUS) manager and a server-side application usage specification (AUS) manager.

16. A cache synchronization method for an object located in a client cache, comprising:
- receiving a transition request to transition to a new state by a client-side distributed application;
- determining the object to be synchronized by a cache synchronizer;
- synchronizing data in the object by passing to a database changes made locally to the object; and
- allowing the distributed application to transition to the new state when synchronization is complete,
- wherein the cache synchronizer comprises a client-side application usage specification (AUS) manager and a server-side application usage specification (AUS) manager.

17. A cache synchronizing system for a distributed application having a client component and a server component, comprising:
- a cache synchronizer interposed between the client component and the server component to perform caching services and processing requests;
- wherein the cache synchronizer comprises a client-side application usage specification (AUS) manager and a server-side application usage specification (AUS) manager,
- wherein the client-side application usage specification (AUS) manager is configured to intercept a request made to the server component from the client component and configured to synchronize data on the client component prior to processing the request.

18. The system of claim 17, wherein the server-side application usage specification (AUS) manager and client-side application usage specification (AUS) manager communicate over a network link.

19. The system of claim 17, wherein the server side application usage specification (AUS) manager interacts with the server component.

20. The system of claim 17, wherein the client side application usage manager interacts with the client component.

* * * * *